UNITED STATES PATENT OFFICE.

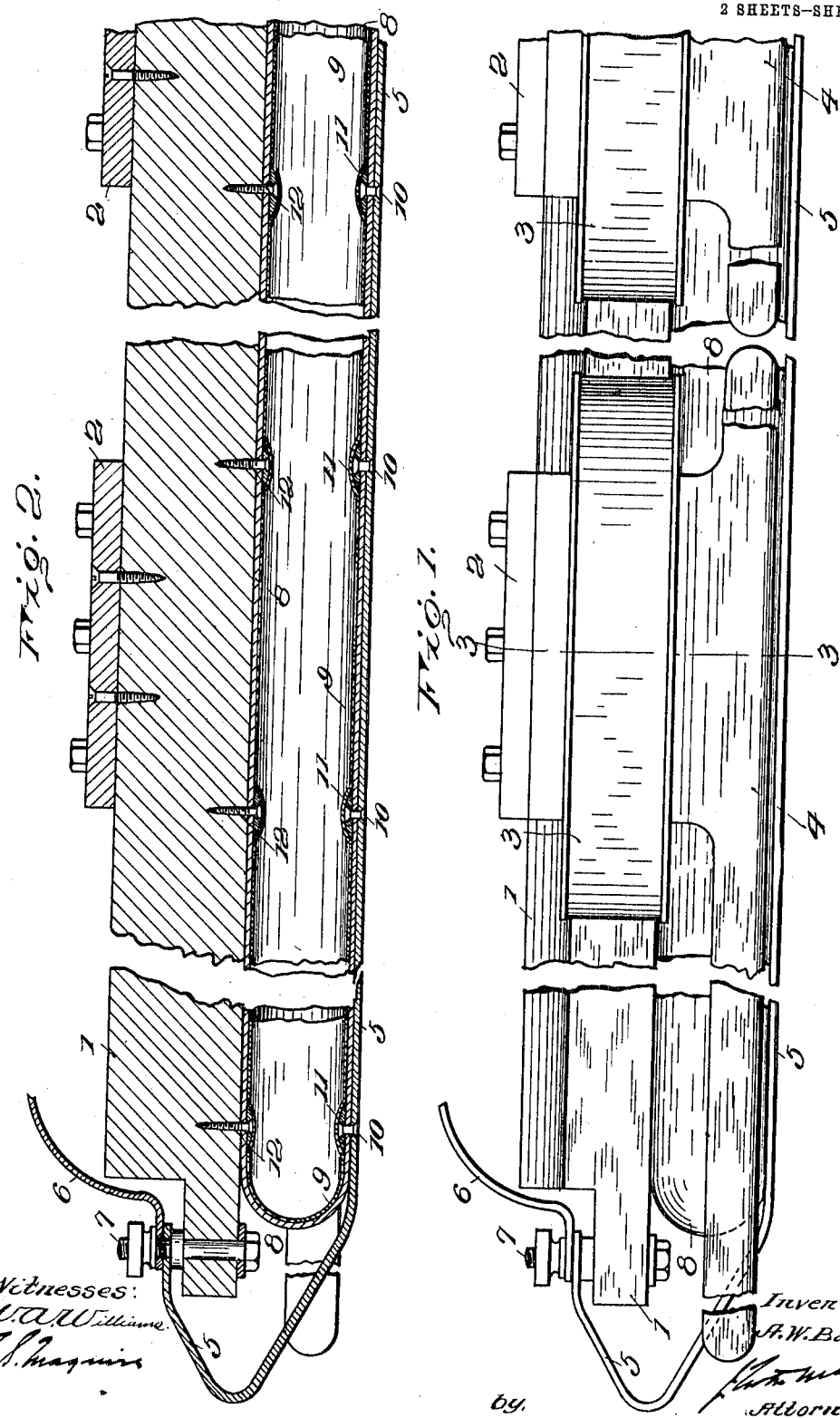

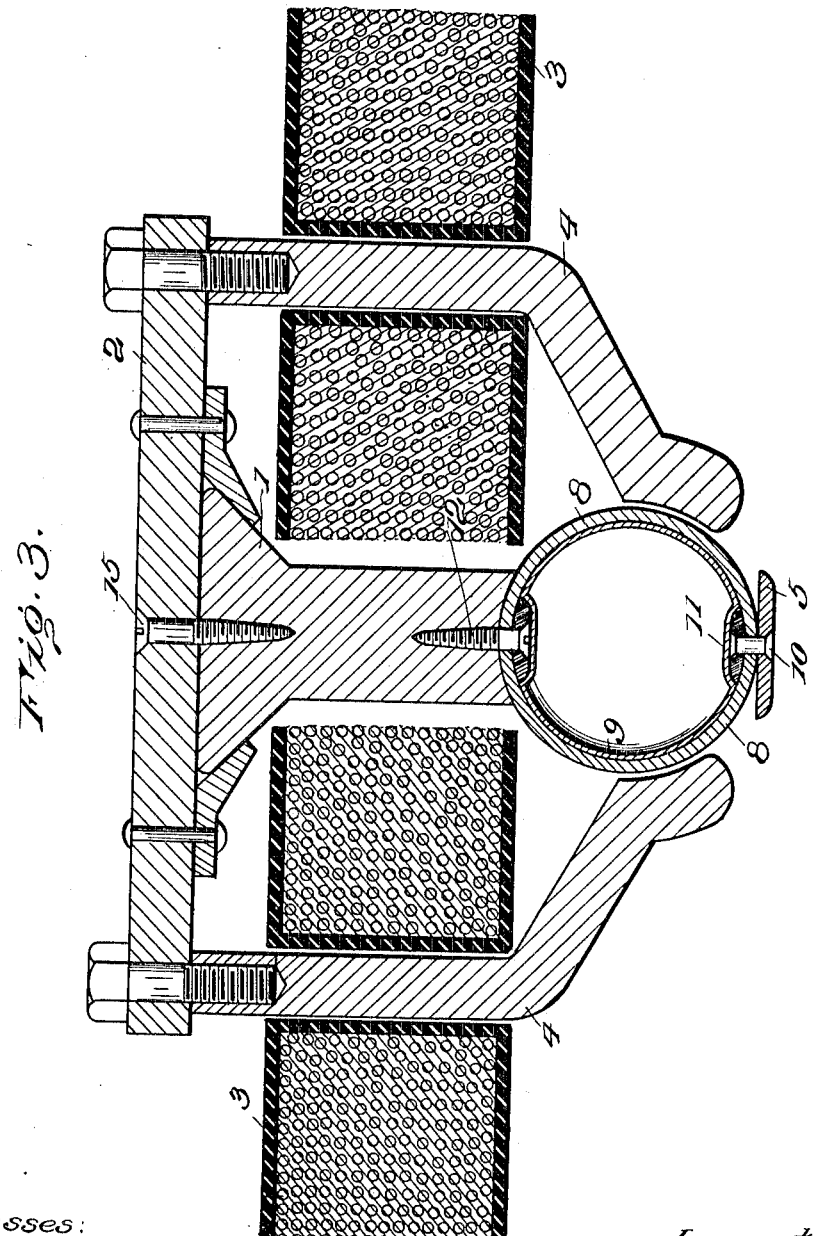

ANTHONY W. BARNHART, OF CAIRO, WEST VIRGINIA, ASSIGNOR TO ELECTRIC UNDERCURRENT COMPANY, OF PENNSBORO, WEST VIRGINIA, A CORPORATION OF WEST VIRGINIA.

SHOE OR SKATE FOR ELECTRIC RAILWAYS.

1,080,410.  Specification of Letters Patent.  Patented Dec. 2, 1913.

Application filed January 31, 1913. Serial No. 745,488.

*To all whom it may concern:*

Be it known that I, ANTHONY W. BARNHART, of Cairo, in the county of Ritchie and State of West Virginia, have invented certain new and useful Improvements in Shoes or Skates for Electric Railways; and I do hereby declare the following to be a full, clear, and exact description of the invention, such as will enable others skilled in the art to which it appertains to make and use the same.

The primary object of this invention is to provide an improved simple and highly efficient shoe or skate for electric traction cars, particularly that class which derives motive power from spaced-apart conductor sections located between the rails and containing armatures, which sections are successively energized through magnets carried by shoes or skates on the cars.

A further object is to so arrange the current collector relatively to the magnetic pole pieces as to prevent arcing within the conductor sections; and a further object is to allow the shoe or skate to readily accommodate itself to irregularities or unevenness in the surface of the road, and at the same time to insure firm contact with the conductor sections.

In the accompanying drawings, Figure 1 is a side elevation showing portions of two shoes. Fig. 2 is a central longitudinal sectional view. Fig. 3 is an enlarged central cross-sectional view.

Referring to the drawings, 1 designates the body of the shoe or skate to the top of which is secured the armature plate 2 of oppositely disposed electromagnets 3, the pole pieces 4 of which depend from the armature plate. These pole pieces at their lower ends are extended inwardly toward each other, as shown in Fig. 3, and are elongated and extend to and beyond the ends of the body 1.

The collector 5 is shown in the form of a horizontal metallic strip extending longitudinally beneath body 1 and carried upwardly at its ends between the elongated pole pieces, but short of the ends thereof, so as to prevent sparking, the sections, according to my invention, coming under the influence of the elongated pole pieces before the collector comes in contact therewith. The ends of the collector are connected to wires 6 by common conductor posts 7, as shown in Figs. 1 and 2, said wires leading to a battery or other generator (not shown) on the car.

The collector strip is free to adapt itself to any unevenness in the road bed or in the conductor sections by reason of the fact that it is free to move up and down. For this purpose I mount it on a pneumatic tube which may be charged with air by any known agency. The particular construction of the pneumatic tube is immaterial, but it is preferably made of fiber fabric or rubber. I have shown it as comprising an outer casing 8 and an inner tube 9, the casing 8 having connected thereto the collector 5 by rivets 10, and it in turn is connected by screws 12 to body 1. By this means I am enabled to insure the firm engagement of the collector with the contact pieces of the conductor sections, and yet avoid undue amount of friction since the collector, or more particularly the casing, may readily and easily yield. It will be noted, from Fig. 3, that the pole pieces are curved along their inner oposite faces to accommodate the pneumatic casing which lies between them.

The advantages of my invention will be readily appreciated by those skilled in the art. It will be seen that by means thereof firm contact of the collector with the conductor sections is insured and all danger of breaking or undue strain is avoided by the resiliency of the tube carrying the collector strip; and also that by elongated the ends of the pole pieces beyond the contact portions of the collectors all danger of sparking within the conductor sections is avoided.

I claim as my invention:

1. A shoe or skate for electric railways comprising a body, magnets carried thereby and having elongated horizontal pole pieces, an electric collector located between the vertical planes of the elongated portions of the pole pieces and extended upwardly between the ends of said pole pieces, and means yieldingly supporting said collector.

2. A shoe or skate for electric railways comprising a body, magnets carried thereby and having elongated horizontal pole pieces, an electric collector located between the vertical planes of the elongated portions of the pole pieces and extended upwardly between the ends of said pole pieces, and a pneumatic device for connecting said collector to said body.

3. A shoe or skate for electric railways comprising a body, magnets carried thereby and having elongated horizontal pole pieces, an electric collector located between the vertical planes of the elongated portions of the pole pieces and extended upwardly between the ends of said pole pieces, and a pneumatic casing located between said pole pieces and connected to said body, said collector being secured to said casing.

4. A shoe or skate for electric railways comprising a body, magnets carried thereby and having pole pieces extended inwardly toward each other at their lower ends, a pneumatic casing secured to said body and located between said ends of the pole pieces, and an electric collector secured to the under side of said casing.

In testimony whereof, I have signed this specification in the presence of two subscribing witnesses.

ANTHONY W. BARNHART.

Witnesses:
C. C. SEARS,
M. E. SUMMERS.

---

Copies of this patent may be obtained for five cents each, by addressing the "Commissioner of Patents, Washington, D. C."